United States Patent
Sundaresan et al.

(10) Patent No.: US 9,098,853 B2
(45) Date of Patent: Aug. 4, 2015

(54) METHOD, MEDIUM, AND SYSTEM FOR REDUCING PRODUCT RETURNS

(71) Applicant: eBay Inc., San Jose, CA (US)

(72) Inventors: Muthu Sundaresan, Austin, TX (US); Vivek Gupta, Yarrow Point, WA (US)

(73) Assignee: eBay, Inc., San Jose, CA (US)

( * ) Notice: Subject to any disclaimer, the term of this patent is extended or adjusted under 35 U.S.C. 154(b) by 70 days.

(21) Appl. No.: 13/658,592

(22) Filed: Oct. 23, 2012

(65) Prior Publication Data
US 2014/0114803 A1    Apr. 24, 2014

(51) Int. Cl.
*G06Q 30/00* (2012.01)

(52) U.S. Cl.
CPC ............................... *G06Q 30/00* (2013.01)

(58) Field of Classification Search
CPC .......... G03Q 30/0601; G03Q 30/0641; G03Q 30/0609
USPC ....................... 705/26.1, 26.3, 27.1
See application file for complete search history.

(56) References Cited

U.S. PATENT DOCUMENTS 8,768,784 B1 *   7/2014  Varadarajan et al. ...... 705/26.35
2003/0225625 A1 * 12/2003  Chew et al. .................... 705/24

OTHER PUBLICATIONS

Customer Fraud and Business Responses Kelly Tian, Bill Keep Greenwood Publishing Group, 2002—Business & Economics.*

* cited by examiner

*Primary Examiner* — Matthew Zimmerman
(74) *Attorney, Agent, or Firm* — Schwegman Lundberg & Woessner, P.A.

(57) ABSTRACT

A system and method of determining whether to make an item listing visible to a user are disclosed. A user is enabled to navigate an e-commerce site. A returns frequency index is calculated for the user based on the user's transaction history. The user's transaction history includes the user's history of item returns. It is determined whether or not to make an item listing visible to the user on the e-commerce site based on the returns frequency index for the user. In some embodiments, the returns frequency index is calculated using the mathematical expression $(V_{Ret}/N_{Ret})/(V_{Purch}/N_{Purch})$, wherein $V_{Ret}$ is a total value of items returned by the user, $N_{Ret}$ is a total number of items returned by the user, $V_{Purch}$ is a total value of items purchased by the user, and $N_{Purch}$ is a total number of items purchased by the user.

18 Claims, 6 Drawing Sheets

METHOD, MEDIUM, AND SYSTEM FOR REDUCING PRODUCT RETURNS

TECHNICAL FIELD

The present application relates generally to the technical field of electronic commerce (e-commerce), and, in various embodiments, to systems and methods of determining whether to make an item listing visible to a user based on the user's item return history.

BACKGROUND

One of the biggest concerns for e-commerce sellers is how to handle buyers that frequently return items. When a buyer returns an item, the process can be quite involved. The seller typically has to arrange to have the item returned, often in packaging, restock the returned item, and return the money to the buyer. These tasks consume valuable seller resources. Additionally, when it comes to certain e-commerce sites, such as eBay, the seller not only loses the sale revenue that has to be returned to the buyer, but the seller is also typically responsible for the cost of the return label that is used by the buyer to return the item. Therefore, the seller has to pay for the buyer's decision to return the item.

A problem arises in how to expose e-commerce sellers to potential buyers that are less likely to return items. There are a lot of people who are chronic returners. These chronic returners shop, try something they like, and, even if they do not have any problem with the item, they still return it because they have a habit of buying something and then returning it as soon as possible. This chronic returning creates a problem for sellers, particularly small sellers that do not have the resources of big retailers.

BRIEF DESCRIPTION OF THE DRAWINGS

Some embodiments of the present invention are illustrated by way of example and not limitation in the figures of the accompanying drawings, in which like reference numbers indicate similar elements and in which.

DETAILED DESCRIPTION

Figure 1:
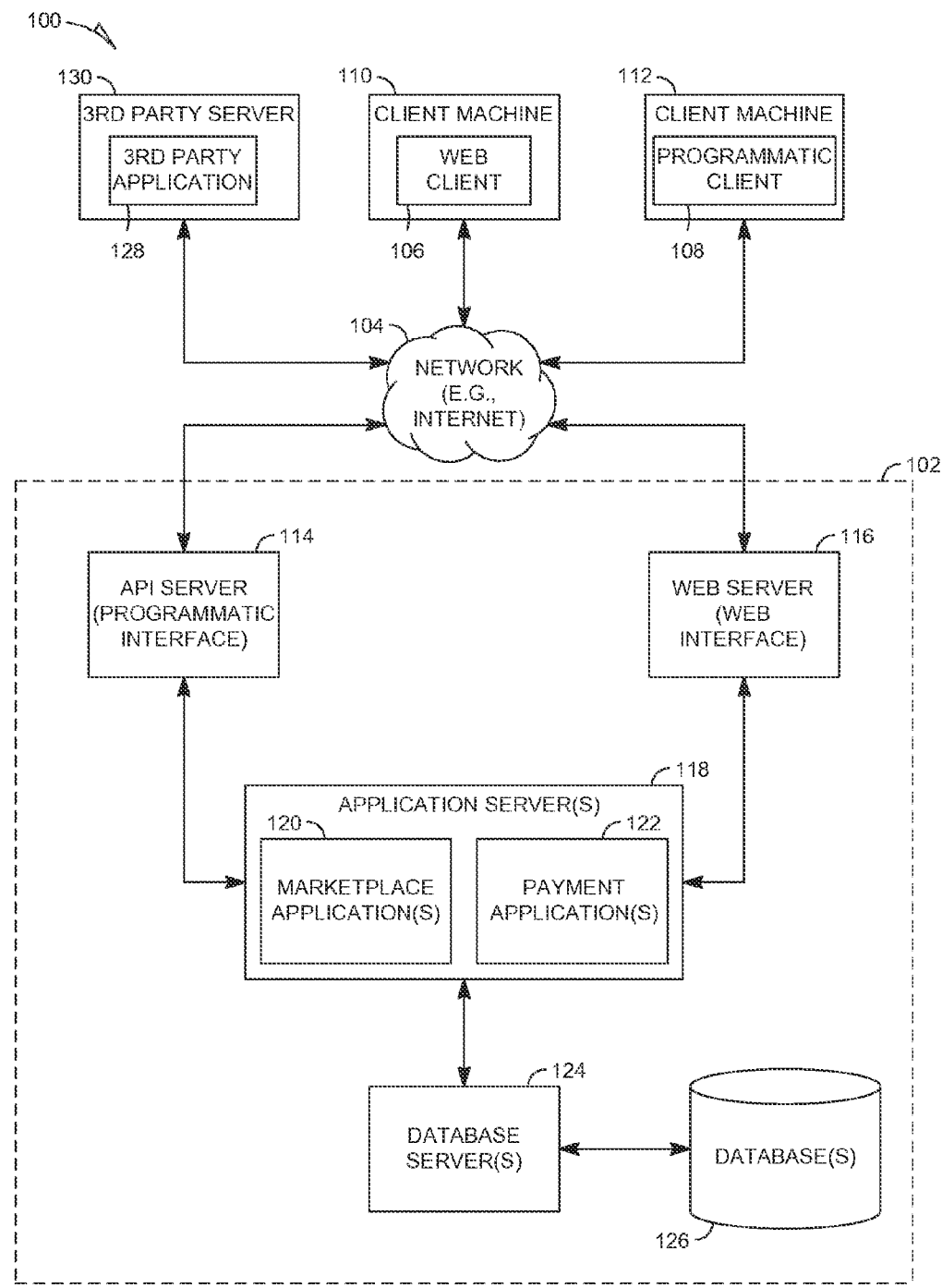
FIG. 1 is a block diagram depicting a network architecture of a system, according to some embodiments, having a client-server architecture configured for exchanging data over a network.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure provides a way for sellers to protect themselves from buyers that frequently return items. A returns frequency index can be calculated for a buyer. This returns frequency index is an indication of the risk that the buyer will return an item. This returns frequency index can be calculated using data from the buyer's transaction history, such as the total number of items returned by the buyer, the total value of the items returned by the buyer, the total number of items purchased by the buyer, and the total value of items purchased by the buyer. A seller can restrict the visibility of his or her item listing to buyers who have a certain returns frequency index, thereby preventing buyers who do not meet the seller's standard for the returns frequency index from viewing the seller's item listing. This visibility restriction based on the returns frequency index provides the seller with increased protection from the item being purchased by a buyer who is likely to return the item. This program of item listing visibility can be offered to sellers as an option, and in some cases for a nominal fee.

In some embodiments, a user is enabled to navigate an e-commerce site. A returns frequency index is generated for the user based on the user's transaction history. The user's transaction history includes the user's history of item returns. It is determined whether or not to make an item listing visible to the user on the e-commerce site based on the returns frequency index for the user.

In some embodiments, the user's history of item returns includes a total number of items the user has returned. In some embodiments, the user's history of item returns includes a total value of items the user has returned. In some embodiments, the user's transaction history further includes a total number of items purchased by the user. In some embodiments, the user's transaction history further includes a total value of items purchased by the user.

In some embodiments, generating the returns frequency index includes using the mathematical expression $(V_{Ret}/N_{Ret})/(V_{Purch}/N_{Purch})$, wherein $V_{Ret}$ is a total value of items returned by the user, $N_{Ret}$ is a total number of items returned by the user, $V_{Purch}$ is a total value of items purchased by the user, and $N_{Purch}$ is a total number of items purchased by the user. In some embodiments, an item listing is made invisible to the user on the e-commerce site in response to the returns frequency index for the user being above a predetermined threshold.

In some embodiments, the user's transaction history upon which the returns frequency index is based excludes returns caused by the user not receiving an item within a predetermined amount of time and returns caused by the user receiving an item different from what the user purchased. In some embodiments, a seller of an item on the e-commerce site is enabled to select whether visibility of the item's listing to users on the e-commerce site will be determined based on the returns frequency index for each user. In some embodiments, the visibility to the user of the item listing on the e-commerce site is restricted based on the returns frequency index for the user only after the user has built up a predetermined amount of transaction history on the e-commerce site.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Wash. State) and a programmatic client 108 executing on respective client machines 110 and 112.

An API server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
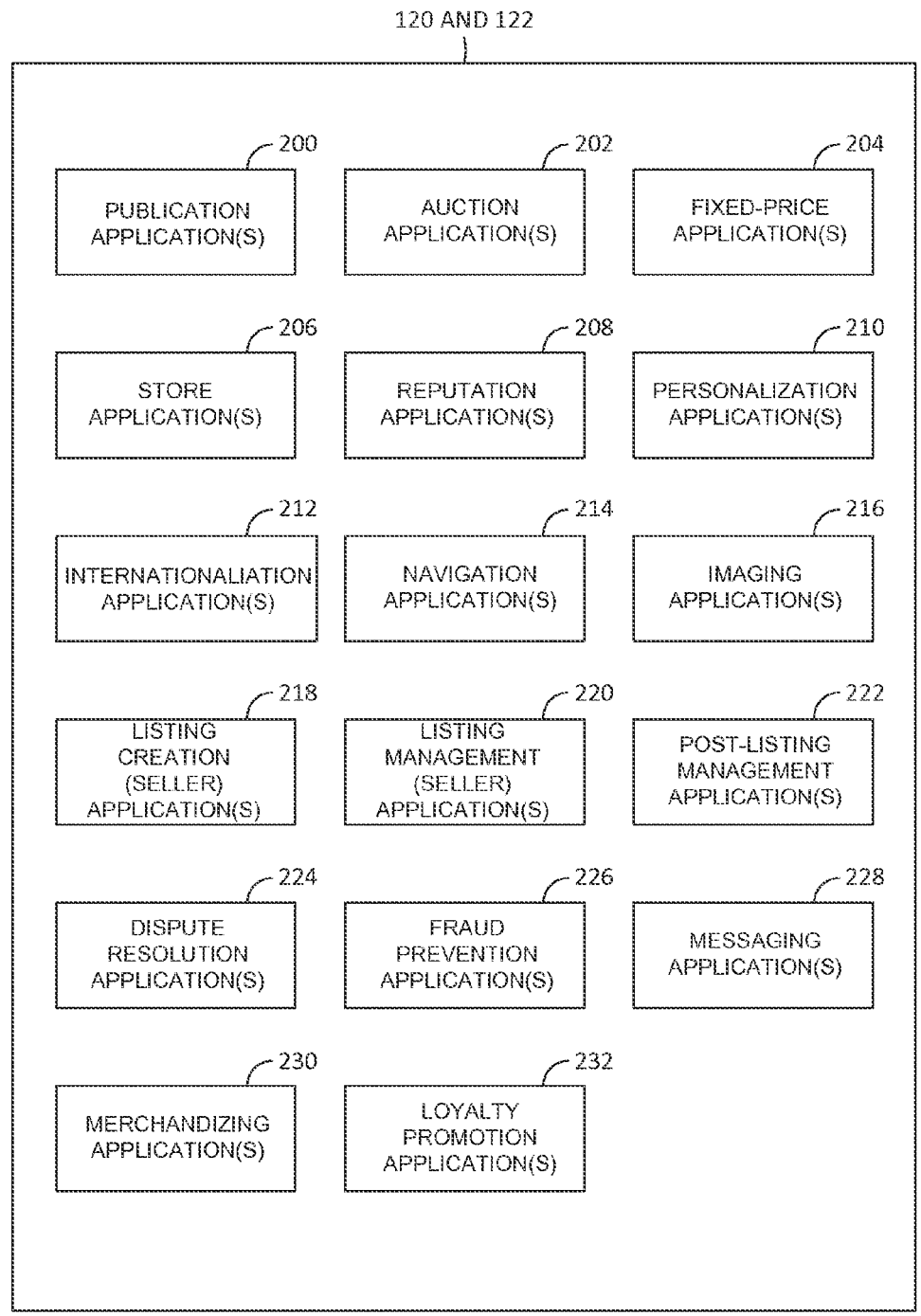
FIG. 2 is a block diagram depicting a various components of a network-based publisher, according to some embodiments.

FIG. 2 is a block diagram illustrating multiple applications 120 and 122 that, in one example embodiment, are provided as part of the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 and 122 are shown to include at least one publication application 200 and one or more auction applications 202, which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make listings, available via the networked system 102, as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such as, for example, messages advising users regarding the status of listings at the networked system 102 (e.g., providing "outbid" notices to bidders during an auction process or to providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

Figure 3:
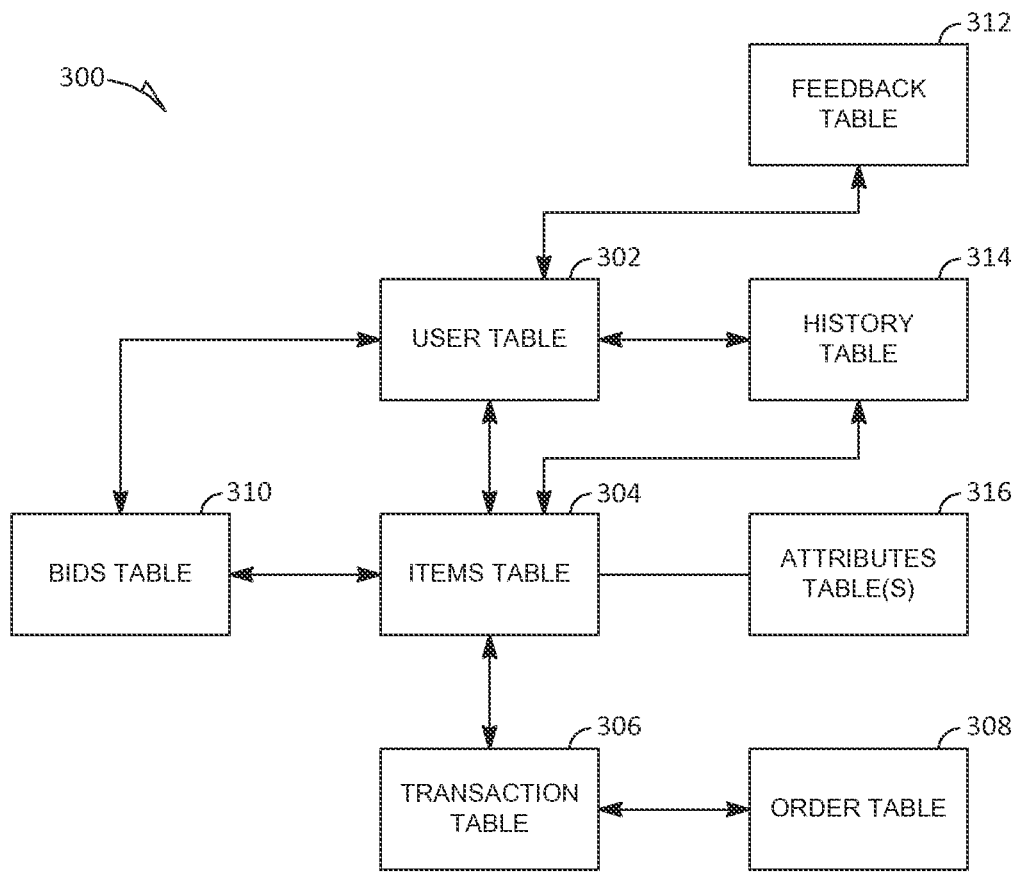
FIG. 3 is a block diagram depicting an example embodiment of various tables that may be maintained within a database.

FIG. 3 is a high-level entity-relationship diagram, illustrating various tables 300 that may be maintained within the database(s) 126, and that are utilized by and support the applications 120 and 122. A user table 302 contains a record for each registered user of the networked system 102, and may include identifier, address and financial instrument information pertaining to each such registered user. A user may operate as a seller, a buyer, or both, within the networked system 102. In one example embodiment, a buyer may be a user that has accumulated value (e.g., commercial or proprietary currency), and is accordingly able to exchange the accumulated value for items that are offered for sale by the networked system 102.

The tables 300 also include an items table 304 in which are maintained item records for goods and services that are available to be, or have been, transacted via the networked system 102. Each item record within the items table 304 may furthermore be linked to one or more user records within the user table 302, so as to associate a seller and one or more actual or potential buyers with each item record.

A transaction table 306 contains a record for each transaction (e.g., a purchase or sale transaction) pertaining to items for which records exist within the items table 304.

An order table 308 is populated with order records, each order record being associated with an order. Each order, in turn, may be with respect to one or more transactions for which records exist within the transaction table 306.

Bid records within a bids table 310 each relate to a bid received at the networked system 102 in connection with an auction-format listing supported by an auction application 202. A feedback table 312 is utilized by one or more reputation applications 208, in one example embodiment, to construct and maintain reputation information concerning users. A history table 314 maintains a history of transactions to which a user has been a party. One or more attributes tables 316 record attribute information pertaining to items for which records exist within the items table 304. Considering only a single example of such an attribute, the attributes tables 316 may indicate a currency attribute associated with a particular item, the currency attribute identifying the currency of a price for the relevant item as specified by a seller.

Figure 4:
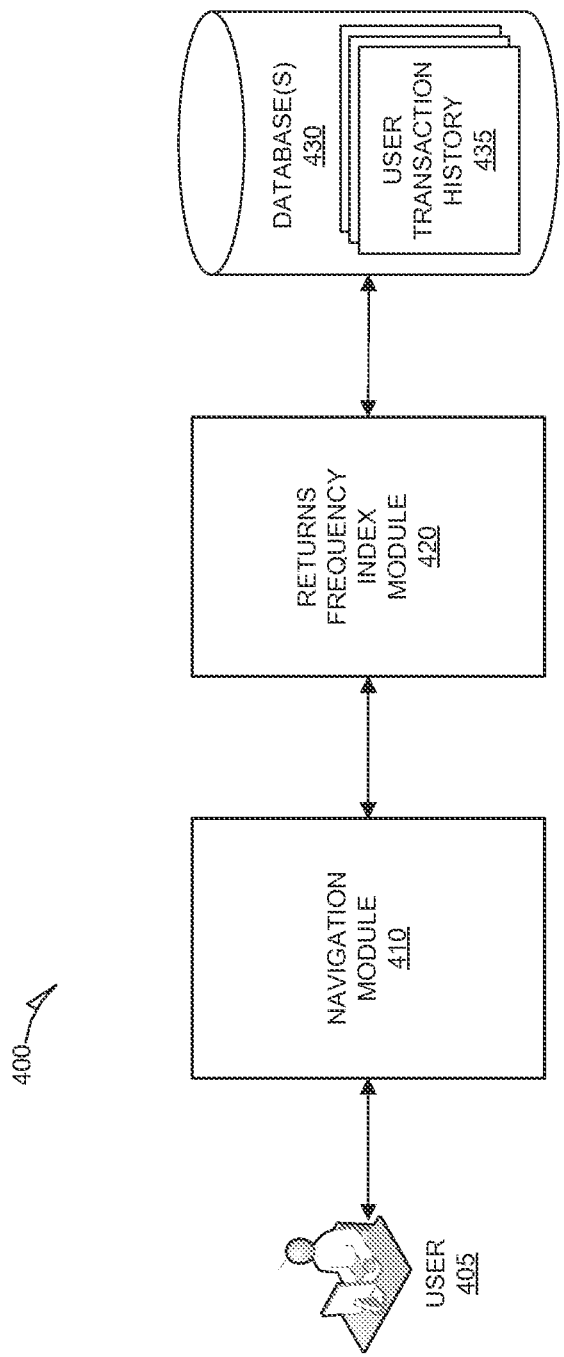
FIG. 4 is a block diagram illustrating an example embodiment of a system that determines whether to make an item listing visible to a user.

FIG. 4 is a block diagram illustrating an example embodiment of a system 400 that determines whether to make an item listing visible to a user. The system 400 comprises a navigation module 410 communicatively coupled to a returns frequency index module 420. The navigation module 410 is configured to enable a user 405 to navigate an e-commerce site. The navigation module 410 can incorporate the one or more navigation applications 214, discussed above with respect to FIG. 2, in order to provide searching and browsing functions, as well as other navigating functions. In navigating the e-commerce site, the user 405 is able to view item listings. The navigation module 410 is configured to determine whether or not to make an item listing visible to the user 405 based on a returns frequency index for the user 405.

The returns frequency index module 420 is communicatively coupled to the navigation module 410 and is configured to generate a returns frequency index for the user 405. The returns frequency index indicates the likelihood and risk that the buyer will return an item. The returns frequency index module 420 is configured to generate the returns frequency index based on the user's transaction history 435. The transaction histories 435 for the users 405 of the e-commerce site can be stored in one or more databases 430. The user's transaction history 435 includes the user's history of item returns. In some embodiments, the user's history of item returns includes a total number of items the user 405 has returned. In some embodiments, the user's history of item returns includes a total value of items the user 405 has returned. In some embodiments, the user's transaction history 435 includes a total number of items purchased by the user 405. In some embodiments, the user's transaction history 435 includes a total value of items purchased by the user 405.

In some embodiments, the returns frequency index is generated using the mathematical expression $(V_{Ret}/N_{Ret})/(V_{Purch}/N_{Purch})$, wherein $V_{Ret}$ is a total value of items returned by the user, $N_{Ret}$ is a total number of items returned by the user, $V_{Purch}$ is a total value of items purchased by the user, and $N_{Purch}$ is a total number of items purchased by the user. In some embodiments, the returns frequency index can equal $(V_{Ret}/N_{Ret})/(V_{Purch}/N_{Purch})$. In other embodiments, the returns frequency index can be generated using $(V_{Ret}/N_{Ret})/(V_{Purch}/N_{Purch})$ within a larger mathematical expression. In some embodiments, an item listing is made invisible to the user 405 on the e-commerce site in response to the returns frequency index for the user 405 being above a predetermined threshold. For example, in some embodiments, an item listing is made invisible to the user 405 if the returns frequency index for the user 405 is greater than 0.25.

In some embodiments, visibility of item listings to the user 405 is not limited until the user 405 builds up a predetermined amount of transaction history, thereby providing a grace period for new users 405. Without this grace period, if a new user 405 buys and returns his first item, then he could be penalized right away, having his visibility of certain item listings restricted going forward. Such a scenario could be undesirable for sellers, as new users 405 could be excluded from viewing their item listings even though there is not yet enough information to indicate that these new users 405 are a high risk for returning items. In some embodiments, the grace period for item listings on an e-commerce site can be configured by a site administrator. In some embodiments, a seller can configure the grace period for his or her own listing.

In some embodiments, the returns frequency index module 420 may be configured to generate the returns frequency index based on a particular restricted use of the user's transaction history 435. For example, in some embodiments, the returns frequency index module 420 may be configured to generate a returns frequency index based on a user transaction history 435 that does not include returns caused by the user 405 not receiving an item in a timely manner. Additionally, in some embodiments, the returns frequency index module 420 may be configured to generate a returns frequency index based on a user transaction history 435 that does not include returns caused by the user 405 receiving an item different from what the user 405 purchased (e.g., purchasing an iPhone and receiving an iPod). In some embodiments, a site administrator may identify and configure what portions of the transaction history 435 are used in calculating the returns frequency index. In some embodiments, a seller may identify and configure what portions of the transaction history 435 are used in calculating the returns frequency index for determining visibility for his or her own listing.

Figure 5:
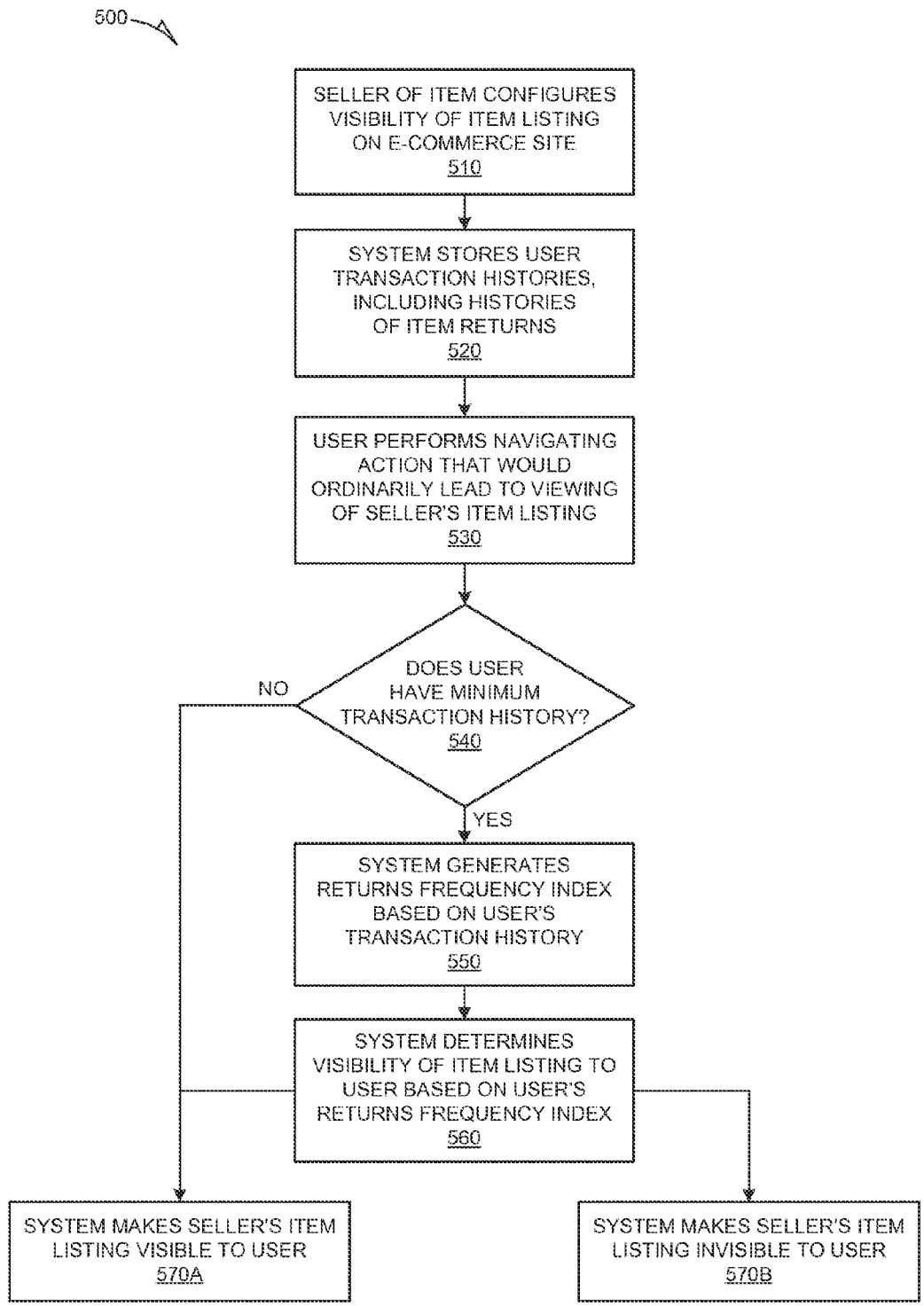
FIG. 5 is a flowchart illustrating an example embodiment of a method of determining whether to make an item listing visible to a user.

FIG. 5 is a flowchart illustrating an example embodiment of a method 500 of determining whether to make an item listing visible to a user.

At operation 510, the seller of an item configures the visibility of his or her item listing on an e-commerce site. The e-commerce site's system may receive, from the seller, configuration information that configures the visibility of the seller's item listing on the e-commerce site and may store it in a database. It is contemplated that the visibility can additionally or alternatively be configured by a site administrator so that the particular visibility configuration applies to multiple item listings belonging to different sellers. This visibility configuration can include, but is not limited to, the returns frequency index visibility threshold, how to calculate the returns frequency index, and the grace period discussed above.

At operation 520, the e-commerce site's system stores user transaction histories for users of its site. As previously discussed, each user transaction history can include a user's history of item returns. In some embodiments, the user's history of item returns includes a total number of items the user has returned. In some embodiments, the user's history of item returns includes a total value of items the user has returned. In some embodiments, the user's transaction history includes a total number of items purchased by the user. In some embodiments, the user's transaction history includes a total value of items purchased by the user.

At operation 530, a user may perform a navigating action on the e-commerce site that would ordinarily lead to a viewing of the seller's item listing, which has been configured with a particular visibility setting. Such navigating action can include, but is not limited to, searching and browsing.

At operation 540, the e-commerce site's system determines whether or not the user has the minimum amount of transaction history needed to use the returns frequency index. If the user does not have the minimum amount of transaction history needed, such as if the user is brand new to using the e-commerce site, then the user is within the grace period and the e-commerce site makes the seller's item listing visible to the user at operation 570A. If the user does have the minimum amount of transaction history needed, then the system proceeds to use the returns frequency index as a standard for visibility of the item listing to the user.

At operation 550, the system generates the returns frequency index for the user based on the user's transaction history. It is contemplated that the returns frequency index for the user may have been previously generated and stored by the system prior to the user performing the navigating action at operation 530. As previously discussed, the user's transaction history may include the history of item returns for the user. In some embodiments, the history of item returns for the user includes a total number of items the user 405 has returned. In some embodiments, the history of item returns for the user includes a total value of items the user 405 has returned. In some embodiments, the user's transaction history includes a total number of items purchased by the user 405. In some embodiments, the user's transaction history includes a total value of items purchased by the user 405. In some embodiments, the returns frequency index is generated using the mathematical expression $(V_{Ret}/N_{Ret})/(V_{Purch}/N_{Purch})$, wherein $V_{Ret}$ is a total value of items returned by the user, $N_{Ret}$ is a total number of items returned by the user, $V_{Purch}$ is a total value of items purchased by the user, and $N_{Purch}$ is a total number of items purchased by the user. In some embodiments, the returns frequency index can equal $(V_{Ret}/N_{Ret})/(V_{Purch}/N_{Purch})$. In other embodiments, the returns frequency index can be generated using $(V_{Ret}/N_{Ret})/(V_{Purch}/N_{Purch})$ within a larger mathematical expression.

At operation 560, the system may determine whether or not the item listing is made visible to the user by comparing the returns frequency index for the user with a visibility standard configured by the seller or administrator at operation 510. For example, if the returns frequency index for the user does meet the standard, then the item listing is made visible to the user at operation 570A. Contrawise, if the returns frequency index for the user does not meet the standard, then the item listing is made invisible to the user at operation 570B.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
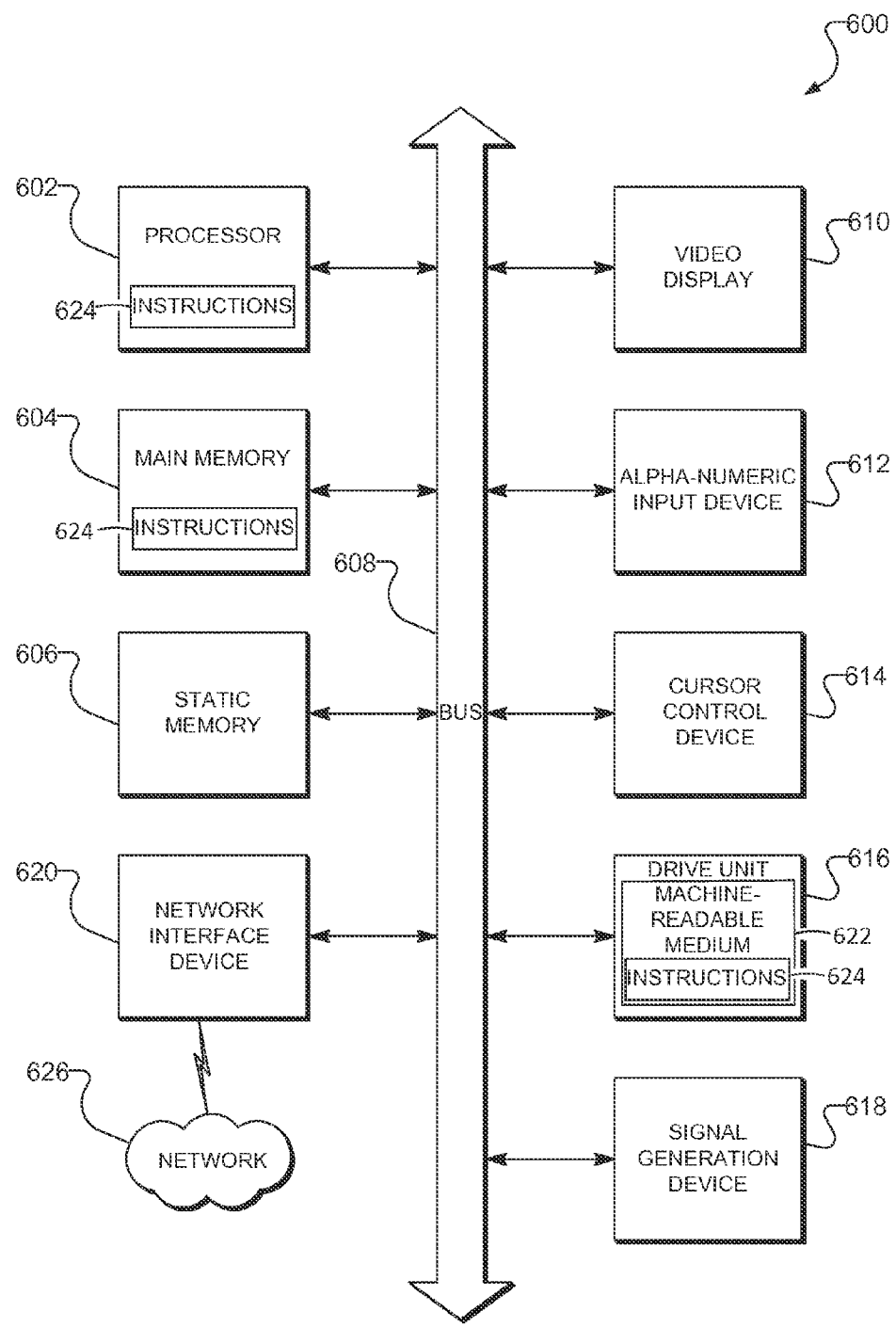
FIG. 6 shows a diagrammatic representation of a machine in the example form of a computer system within which a set of instructions may be executed to cause the machine to perform any one or more of the methodologies discussed herein.

FIG. 6 is a block diagram of a machine in the example form of a computer system 600 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a disk drive unit 616, a signal generation device 618 (e.g., a speaker) and a network interface device 620.

Machine-Readable Medium

The disk drive unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
    at least one processor;
    a returns frequency index module, executable by the at least one processor, configured to:
        generate a first returns frequency index for a first user based on a first transaction history for the first user, the first transaction history for the first user includes a first history of item returns for the first user; and
        generate a second returns frequency index for a second user based on a second transaction history for the second user, the second transaction history for the second user includes a second history of item returns for the second user; and
    a navigation module, executable by the at least one processor, configured to:
        determine that the first returns frequency index is above a predetermined threshold;
        create first content for display to the first user, the creating first content comprising excluding an item listing from the first content for display based on the determination that the first returns frequency index is above the predetermined threshold;
        determine that the second returns frequency index is below the predetermined threshold; and
        create second content for display to the second user, the creating second content comprising including the item listing in the second content for display based on the determination that the second returns frequency index is below the predetermined threshold.

2. The system of claim 1, wherein the first history of item returns for the first user includes a total number of items the first user has returned.

3. The system of claim 2, wherein the first history of item returns for the first user includes a total value of items the first user has returned.

4. The system of claim 2, wherein the first transaction history for the first user further includes a total number of items purchased by the first user.

5. The system of claim 2, wherein the first transaction history for the first user further includes a total value of items purchased by the first user.

6. The system of claim 1, wherein the returns frequency index module is configured to generate the first returns frequency index using the mathematical expression: $(V_{Ret}/N_{Ret})/(V_{Purch}/N_{Purch})$, wherein $V_{Ret}$ is a total value of items returned by the first user, $N_{Ret}$ is a total number of items returned by the first user, $V_{Purch}$ is a total value of items purchased by the first user, and $N_{Purch}$ is a total number of items purchased by the first user.

7. The system of claim 1, wherein the first transaction history for the first user upon which the first returns frequency index is based excludes returns caused by the first user not receiving an item within a predetermined amount of time and returns caused by the first user receiving an item different from what the first user purchased.

8. A computer-implemented method comprising:
    generating, by a machine having a memory and at least one processor, a first returns frequency index for a first user based on a first transaction history for the first user, the first transaction history for the first user includes a first history of item returns for the first user;
    determining that the first returns frequency index is above a predetermined threshold;
    creating first content for display to the first user, the creating first content comprising excluding an item listing from the first content for display based on the determination that the first returns frequency index is above the predetermined threshold;
    generating, by the machine, a second returns frequency index for a second user based on a second transaction history for the second user, the second transaction history for the second user includes a second history of item returns for the second user;
    determining that the second returns frequency index is below the predetermined threshold; and
    creating second content for display to the second user, the creating second content comprising including the item listing in the second content for display based on the determination that the second returns frequency index is below the predetermined threshold.

9. The method of claim 8, wherein the first history of item returns for the first user includes a total number of items the first user has returned.

10. The method of claim 9, wherein the first history of item returns for the first user includes a total value of items the first user has returned.

11. The method of claim 9, wherein the first transaction history for the first user further includes a total number of items purchased by the first user.

12. The method of claim 9, wherein the first transaction history for the first user further includes a total value of items purchased by the first user.

13. The method of claim 8, wherein generating the first returns frequency index includes using the mathematical expression $(V_{Ret}/N_{Ret})/(V_{Purch}/N_{Purch})$, wherein $V_{Ret}$ is a total value of items returned by the first user, $N_{Ret}$ is a total number of items returned by the first user, $V_{Purch}$ is a total value of items purchased by the first user, and $N_{Purch}$ is a total number of items purchased by the first user.

14. The method of claim 8, wherein the first transaction history for the first user upon which the first returns frequency index is based excludes returns caused by the first user not receiving an item within a predetermined amount of time and returns caused by the first user receiving an item different from what the first user purchased.

15. A non-transitory machine-readable storage device storing a set of instructions that, when executed by at least one processor, causes the at least one processor to perform operations comprising:
   generating, by a machine having a memory and at least one processor, a first returns frequency index for a first user based on a first transaction history for the first user, the first transaction history for the first user includes a first history of item returns for the first user; and
   determining that the first returns frequency index is above a predetermined threshold;
   creating first content for display to the first user, the creating first content comprising excluding an item listing from the first content for display based on the determination that the first returns frequency index is above the predetermined threshold;
   generating, by the machine, a second returns frequency index for a second user based on a second transaction history for the second user, the second transaction history for the second user includes a second history of item returns for the second user;
   determining that the second returns frequency index is below the predetermined threshold; and
   creating second content for display to the second user, the creating second content comprising including the item listing in the second content for display based on the determination that the second returns frequency index is below the predetermined threshold.

16. The device of claim 15, wherein the first history of item returns for the first user includes a total number of items the first user has returned.

17. The device of claim 16, wherein the first history of item returns for the first user includes a total value of items the first user has returned.

18. The device of claim 17, wherein generating the first returns frequency index includes using the mathematical expression $(V_{Ret}/N_{Ret})/(V_{Purch}/N_{Purch})$, wherein $V_{Ret}$ is a total value of items returned by the first user, $N_{Ret}$ is a total number of items returned by the first user, $V_{Purch}$ is a total value of items purchased by the first user, and $N_{Purch}$ is a total number of items purchased by the first user.

\* \* \* \* \*

UNITED STATES PATENT AND TRADEMARK OFFICE
CERTIFICATE OF CORRECTION

PATENT NO. : 9,098,853 B2  
APPLICATION NO. : 13/658592  
DATED : August 4, 2015  
INVENTOR(S) : Sundaresan et al.

Page 1 of 1

It is certified that error appears in the above-identified patent and that said Letters Patent is hereby corrected as shown below:

On the Title page, in item (73), in "Assignee", in column 1, line 1, delete "eBay," and insert --eBay--, therefor Signed and Sealed this  
Ninth Day of February, 2016

Michelle K. Lee  
*Director of the United States Patent and Trademark Office*